Figures 1, 2:
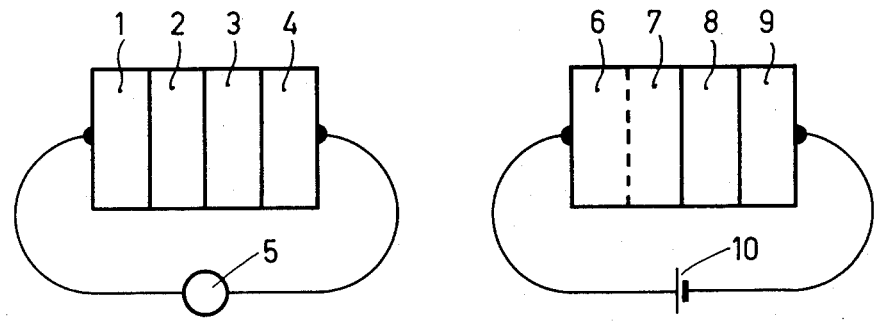

United States Patent [19]
Lotgering et al.

[11] 3,816,179
[45] June 11, 1974

[54] ELECTROCHEMICAL CELL COMPRISING A SOLID ELECTROLYTE

[75] Inventors: Frederik Karel Lotgering; Nicolaas Marinus Beekmans; Gerardus Henricus Antonius Maria Van der Steen; Leopold Heigne, all of Emmasingel, Eindhoven, Netherlands

[73] Assignee: U.S. Philips Corporation, New York, N.Y.

[22] Filed: Aug. 16, 1972

[21] Appl. No.: 281,109

[30] Foreign Application Priority Data
Aug. 19, 1971 Netherlands............... 7111412

[52] U.S. Cl. .................. 136/83 R, 136/153
[51] Int. Cl. ............ H01m 11/00, H01m 35/02
[58] Field of Search........ 136/83 R, 100 R, 20, 137, 136/153, 6 L, 6 LN, 120 FC, 120 R; 252/62.3 S, 62.3 ZT, 439, 46.4

[56] References Cited
UNITED STATES PATENTS

| | | | |
|---|---|---|---|
| 3,443,997 | 5/1969 | Argue et al. | 136/83 R |
| 3,647,549 | 3/1972 | Christie et al. | 136/83 R |
| 3,663,299 | 5/1972 | Owens et al. | 136/83 R |
| 3,701,685 | 10/1972 | Erwin | 136/83 R |
| 3,701,686 | 10/1972 | Argue et al. | 136/83 R |

*Primary Examiner*—Anthony Skapars
*Attorney, Agent, or Firm*—Norman N. Spain; Frank R. Trifari

[57] ABSTRACT

An electrode for an electrochemical cell comprising a solid electrolyte, which electrode consists entirely or partly of solid solutions having the spinel structure defined by the formula $CuM_yCr_2Te_4$ in which M represents Cu or Ag and in which $y = 0-1$ when M = Cu and $y = 0-0.4$ when M = Ag.

2 Claims, 3 Drawing Figures

PATENTED JUN 11 1974　　　　　　　　　3,816,179

ELECTROCHEMICAL CELL COMPRISING A SOLID ELECTROLYTE

The invention relates to an electrochemical cell comprising a solid electrolyte.

Electrochemical cells comprising a solid electrolyte are known. For example, an electrochemical cell comprising a solid electrolyte defined by the formula $MAg_4I_5$, in which M may be K, Rb, $NH_4$ or Cs, is described in the "Proceedings of the sixth International Power Source Symposium", 1968, pages 241–249. In an embodiment of such an electrochemical cell $RbAg_4I_5$ is used as an electrolyte, a mixture of $RbI_3$, carbon and $RbAg_4I_5$ is used as the cathode and a mixture of carbon, silver and $RbAg_4I_5$ is used as the anode.

These and other known electrochemical cells comprising a solid electrolyte which may be used as a current source have, inter alia, the drawback that they are not rechargeable or that after recharging, especially after repeated recharging, the capacity is considerably lower than that of the original cell.

It is assumed that this is to be ascribed to different processes which take place in the cell during discharging and recharging. During recharging a variation in volume may occure due to the withdrawal of material from the cathode mixture and the chemical reactions then taking place. This may give rise to the formation of cavities in the cathode mixture with the result that the mutual contact of the particles in the cathode mixture is locally disturbed.

The problems concerning the anode are at least partly of a different nature because in case of discharge only one material (for example Ag) disappears which is reformed during recharging. When using a plate-like anode a poor contact with the solid electrolyte is established during recharging even when pressure is exerted on the anode so as to improve the contact with the solid electrolyte. It is assumed that during discharging the reactions mainly take place at "active" areas and that these active areas disappear and are not reformed during recharging, or in other words, the processes taking place during discharging and recharging are not completely reversible.

To obviate these problems a mixture of solid electrolyte and metal powder has been used as an anode for known electrochemical cells comprising a solid electrolyte as described above. This is satisfactory for use as a primary cell. When used as a secondary (rechargable) cell, this is not the case because it is assumed that upon recharging the metal is not deposited in the finely divided active form in which it was present in the original cell and therefore is not completely accessible for a subsequent discharge. This means that the capacity of the recharged cell is considerably lower than that of the original cell. In case of repeated discharging and recharging of a cell this becomes manifest to an even larger extent. In addition troublesome polarization phenomena occur in known electrochemical cells comprising a solid electrolyte.

A first object of the invention is to provide an electrode for an electrochemical cell comprising a solid electrolyte which makes it possible to manufacture such a cell which can be repeatedly discharged and recharged and whose capacity after repeated discharging and recharging does not considerably differ from that of the original cell.

A further object of the invention is to provide an electrochemical cell comprising a solid electrolyte in which, after recharging of the cell, metal deposited on the anode is substantially accessible for the discharge process.

It has been found that the objects of the invention can be realized with an electrode entirely or partly consisting of solid solutions (mixed crystals) defined by the formula $CuM_yCr_2Te_4$, in which M represents Cu or Ag and in which $y = 0–1$ when M = Cu and $y = 0–0.4$ when M = Ag, which solid solutions have a cubic structure which is closely related to the spinel structure and whose composition $CuCr_2Te_4$ ($y=0$) has a spinel structure. Said solid solutions will hereinafter be further referred to as solid solutions having the spinel structure.

The invention relates to an electrode for an electrochemical cell comprising a solid electrolyte and is characterized in that the electrode consists entirely or partly of solid solutions having the spinel structure defined by the formula $CuM_yCr_2Te_4$ in which M represent Cu or Ag and in which $y = 0–1$ when M = Cu and $y = 0–0.4$ when M = Ag.

Furthermore the invention relates to an electrochemical cell comprising a solid electrolyte in which transport of copper ions can take place and is characterized in that at least one of the electrode masses consists entirely or partly of solid solutions having the spinel structure and the composition of which is defined by the formula $Cu_{1+y}Cr_2Te_4$ in which formula $y = 0–1$.

The invention furthermore relates to an electrochemical cell comprising a solid electrolyte in which transport of silver ions can take place and is characterized in that at least one of the electrode masses consists entirely or partly of solid solutions having the spinel structure and the composition of which is defined by the formula $CuAg_yCr_2Te_4$ in which formula $y = 0–0.4$ The compound $CuCr_2Te_4$ (copper chromium telluride) is known per se (Proceedings International Conference on Magnetism, Nottingham, 7–11 Sept. 1964, pages 533–537). This compound may be manufactured, for example, by heating finely divided quantities of copper, chromium and tellurium in an atomic ratio of 1:2:4 at 700°C for 16 hours in an evacuated holder of quartz glass.

Solid solutions of the formula $CuM_yCr_2Te_4$ defined above may be manufactured, for example, by mixing a powder of the compound $CuCr_2Te_4$ with pulverulent copper or silver in the molar ratio 1:y and by heating the mixture obtained in an evacuated quartz glass holder at 650°C for 24 hours. Solid solutions defined by the formula $Cu_{1+y}Cr_2Te_4$ in which $y = 0–1$ may alternatively be manufactured by heating in the manner described a mixture of the elements Cu, Cr and Te in the atomic ratio (1+y):2:4. Solid solutions defined by the formula $CuAg_yCr_2Te_4$ in which $y = 0–0.4$ may be obtained by heating in the described manner a mixture of the elements Cu, Ag, Cr and Te in the atomic ratio 1:y:2:4.

The solid solutions defined by the following formulas were thus made and used for the manufacture of electrochemical cells according to the invention:

$Cu_{1.5}Cr_2Te_4$; $Cu_{1.9}Cr_2Te_4$; and $CuAg_{0.25}Cr_2Te_4$.

Investigations have shown that all these solid solutions have a cubic structure which is closely related to the spinel structure. This investigation also showed that all solid solutions have a single phase and that the cell constant $a$ deviates to a slight extent from that of $CuCr_2Te_4$. It was found, for example, that $a = 11.14$ A for $CuCr_2Te_4$ and $a = 11.28$ A for $Cu_{1.9}Cr_2Te_4$.

Furthermore it was found that the diffusion coefficient of copper in $CuCr_2Te_4$ is of the same order as that of the $Cu^+$-ion in solid cuprous chloride.

It is assumed that the fact that with the use of solid solutions of the formula $CuM_yCr_2Te_4$ in which M and $y$ have the above given significance a rechargeable electrochemical cell comprising a solid electrolyte can be manufactured as an electrode is based on the recognition that these solid solutions have a large diffusion coefficient for copper and silver and that with an increasing content of copper (until the composition has become $Cu_2Cr_2Te_4$) or with an increasing content of silver (until the composition has become $CuAg_{0.4}Cr_2Te_4$) the solid solutions maintain their single phase and the crystal lattice only expands to a slight extent and shrinks to a slight extent when copper or silver is separated out. An advantage of solid solutions of the given formula is that they have a large electron conductivity. Another advantage of an electrochemical cell according to the invention is that there is no deposition of a new material and that the deposited material is incorporated in the electrode material. As a result an electrochemical cell according to the invention is not liable to ageing phenomena and there is no dendrite formation.

Solid solutions of the formula defined above may take up considerably more copper than silver while maintaining the original single phase structure and without a considerable variation of the cell constant taking place. This means that while using an electrode of solid solutions of the above-defined formula in which M represents Cu, cells of a larger capacity can be manufactured for equal dimensions than when using an electrode of a compound of the above-defined formula in which M represents Ag.

A fairly large number of solid electrolytes is known whose conductivity for silver ions is sufficiently large at room temperature for use in electrochemical cells. Examples thereof are silver halides of the formula $MAg_4I_5$ in which M may be K, Rb, $NH_4$ and Cs. There are less solid electrolytes whose conductivity for copper ions at room temperature is sufficiently large for this use. An example is $Cu_2HgI_4$.

Based on what has been stated in the two previous paragraphs, solid solutions having the spinel structure defined by the formula $Cu_{1+y}Cr_2Te_4$ may be preferred in given cases as the electrode and in other cases solid solutions defined by the formula $CuAg_yCr_2Te_4$ may be preferred in which $y$ has the above-mentioned values.

The invention will now be further described with reference to some examples.

FIG. 1 diagrammatically shows an electrochemical cell having an electrode as a cathode according to the invention. The housing accommodating the cell for practical use is omitted. In this figure (1) denotes a disk-like copper electrode (diameter 8.0 mm, thickness 1.0 mm). (2) denotes a disk of the solid electrolyte (thickness 1.0 mm). It is obtained by compressing pulverulent cuprous chloride at a pressure of 1,500 kg/sq. cm. (3) is a disk-like electrode consisting of $CuCr_2Te_4$ (thickness 1.0 mm). It is obtained by hydrostatically pressing a powder of $CuCr_2Te_4$ at a pressure of 12,500 kg/sq.cm and by heating the disk thus obtained in an evacuated quartz glass holder at 650°C for 24 hours. A sheet (4) of carbon (thickness 1.0 mm) is provided so as to establish electrical contact with the electrode (3). The disks were pressed together using a light spring pressure (50 g). (1) and (4) were connected together by means of a voltmeter (5). The cell was heated in a nitrogen atmosphere at 250°C. The E.M.F. of the cell was found to be 300 mV; (3) is the positive terminal.

Subsequently, (1) and (4) were connected to a current source and a current of 10 micro-amperes was passed through the cell for 10 minutes in such a direction that $Cu^+$-ions were transported to the electrode (3). (Current direction during discharging). After interruption of the current the cell voltage (E.M.F) was found to be equal within one second to the original value of 300 mV. This implies that the metallic copper deposited during a discharge process at the surface of the electrode (3) is diffused completely into the electrode (3), the $CuCr_2Te_4$. In fact, if this were not the case, metallic copper would be present at the boundary surface between solid electrolyte and electrode and in that case the cell voltage would have decreased to a very low value after interruption of the current because the electrolyte (2) would then have been bounded by two "electrodes" both consisting of copper.

It can also be proved in another manner that copper can diffuse into the electrode (3) within a short time. Prior to composing the cell as shown in FIG. 1, a metallic copper film of approximately 2 $\mu$m thickness was provided by vapour deposition in vacuo on the surface of the electrode (3) which was placed against the electrode (2). The composed cell was heated within 8 minutes to 186°C. It was found that the cell voltage then was already 200 mV. This implies that during heating copper has substantially disappeared from the surface; this must only have happened because the copper has diffused into the electrode (3). It was calculated that the diffusion coefficient for copper in the electrode material is approximately $10^{-10}$ sq.cm/sec. at 186°C.

FIG. 2 diagrammatically shows a further electrochemical cell according to the invention — likewise as in FIG. 1 the housing has been omitted. (6) is an electrode consisting of a mixture of 50 parts by weight of silver powder and 50 parts by weight of pulverulent silver rubidium iodide ($Ag_4RbI_5$) (7) is the solid electrolyte $Ag_4RbI_5$ (6) and (7) are compressed to one disk (diameter 8.0 mm, thickness 2.0 mm) and (8) is a disk (thickness 1.0 mm) of copper chromiumtelluride ($CuCr_2Te_4$) manufactured in a manner as described before. (9) is a disk-like sheet of carbon (thickness 1.0 mm). The cell may be used at room temperature because at this temperature transport of Ag ions can take place sufficiently in rubidium silver iodide. The disks were pressed together, using a light spring pressure (50 g). (6) and (9) were connected to a current source (10) and a current of 200 $\mu$A was passed through the cell for 10 seconds. It was calculated that the diffusion coefficient for silver in the electrode material was approximately $10^{-13}$ sq.cm/sec. Subsequently the E.M.F. was measured. It was found to be substantially zero. After 24 minutes the E.M.F. started to increase and after 48 minutes it had a value of 59 mV. This phenomenon implies that during the passage of current silver was deposited on the surface of the electrode (8) and that it was subsequently diffused comparatively slowly into the copper chromium telluride.

In the cases where in the formula $CuM_yCr_2Te_4 0<Y<1$ when $M = Cu$ and $y$ 0.4 when $M = Ag$ the solid solutions defined by the formula can take up or give off Cu and Ag respectively and it is then possible to use the solid solutions both as anodes and cathodes in the same cell.

An electrochemical cell having an electrode according to the invention may be used as a coulometer. For use as a coulometer it is of importance that there is a direct relationship between the modification of the composition of the solid solutions an electrode consists of and the current passed therethrough, and that there is a direct relationship between the E.M.F. and the composition of the electrode.

All this will be further described with reference to the following example.

In this example the electrode mass consisted of a mixture of solid solutions according to the invention and solid electrolyte. The cell was manufactured as follows. A finely powdered mixture of 0.20 g of solid solutions of the composition $CuAg_{0.25}Cr_2Te_4$ and 0.41 g $RbAg_4I_5$ was pressed together with a sheet of platinum (thickness 0.2 mm), to a tablet (8 mm diameter( (pressure 2,000 kg). A second tablet was manufactured by pressing 0.65 g of silver powder and 0.65 g of $RbAg_4I_5$ together with a silver sheet (thickness 1.0 mm) in the same manner. Both tablets were compressed to one assembly with the interposition of a tablet of 0.5 g of $RbAg_4I_5$. After manufacturing the cell in this manner an E.M.F. of 189 mV was measured (positive terminal is the electrode according to the invention). The cell was completely charged with a current of 1.0 mA. In the completely charged condition, which is the condition at which all of the silver was withdrawn from the solid solutions according to the invention, or in other words, $y$ had become 0 for the solid solutions of the formula $CuAg_yCr_2Te_4$ the E.M.F. was 270 mV.

Figure 3:
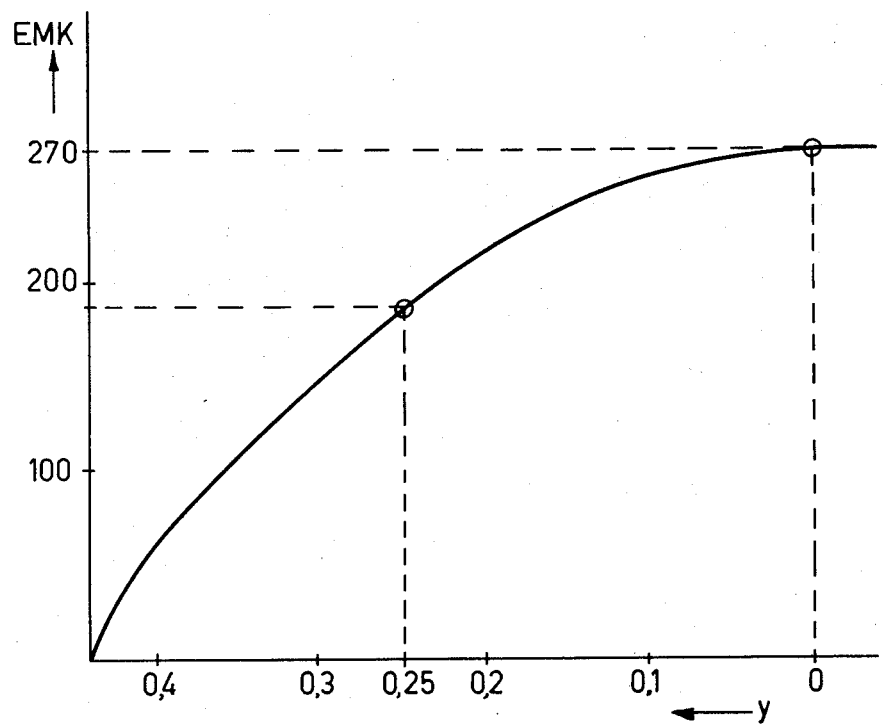

The cell was alternately discharged and recharged eight times at a current of 1.0 mA. The E.M.F. measurements were then performed. FIG. 3 shows the results thereof (the curve shows the mean values of the measurements). In this Figure the E.M.F. is plotted along the vertical axis in mV as a function of $y$ in the formula $CuAg_yCr_2Te_4$ which formula represents the composition of the solid solutions of the electrode.

The Figure shows that there is a direct relationship between the E.M.F. of the cells and the silver content of the solid solutions of the electrode defined by the formula $CuAg_yCr_2Te_4$ in which $y$ may have the value shown in FIG. 3.

It was found that the cell could supply a short short-circuit current of 30 mA without a permanent deterioration of the properties taking place.

In an electrode mass of an electrochemical cell having an electrode according to the invention carbon powder can advantageously be incorporated for improving the contact between the separate particles of the electrode. The addition of carbon powder to electrode masses of electrochemical cells comprising a solid electrolyte is known per se.

As already noted, an electrochemical cell having an electrode according to the invention may be used as a coulometer. This cell may alternatively be used as a timer. For this use a cell may be advantageously used in which an electrode according to the invention of a solid solution defined by the formula $CuAg_yCr_2Te_4$ in which $y$ has the previously mentioned values is used as the one electrode and gold is used as the other electrode or an electrode of a different inert material, for example, carbon is used. The timer is adjusted by passing a given quantity of charge through the cell so that a given quantity of silver is deposited on the gold electrode. The use of the cell as a timer is based on the fact that if a constant current is passed in the reverse direction through the cell, a sudden voltage variation occurs when all of the silver deposited on the gold electrode has disappeared. The period when this is effected is proportional to the quantity of silver deposited on the gold electrode.

What is claimed is:

1. An electrochemical cell comprising electrodes and a solid electrolyte in which transport of copper ions can take place, at least one of said electrodes consisting essentially of a solid solution having the spinel structure defined by the formula $Cu_{1+y}Cr_2Te_4$ in which formula $y = 0-1$.

2. An electrochemical cell comprising electrodes and a solid electrolyte in which transport of silver ions can take place, at least one of said electrodes consisting essentially of a solid solution having the spinel structure defined by the formula $CuAg_yCr_2Te_4$ in which formula $y = 0-0.4$.

* * * * *